United States Patent [19]
Veach et al.

[11] 3,738,392
[45] June 12, 1973

[54] GAS LEAK VALVE

[75] Inventors: Allen M. Veach; William A. Bell, Jr., both of Oak Ridge, Tenn.

[73] Assignee: The United States of America as represented by the United States Atomic Energy Commission, Washington, D.C.

[22] Filed: Dec. 1, 1971

[21] Appl. No.: 203,747

[52] U.S. Cl. ................................. 138/46, 251/121
[51] Int. Cl. ............................................ F15d 1/00
[58] Field of Search .................. 138/46, 40, 44, 45, 138/37, 41, 42, 43; 251/121

[56] References Cited
UNITED STATES PATENTS

| 3,338,548 | 8/1967 | Mott | 138/43 |
| 3,042,079 | 7/1962 | Swift et al. | 138/42 |
| 2,887,129 | 5/1959 | Stear | 138/43 |
| 2,118,830 | 5/1938 | Veenschoten | 251/133 X |

Primary Examiner—George E. Lawrence
Assistant Examiner—Steven Pollard
Attorney—Roland A. Anderson

[57] ABSTRACT

A gas leak valve is provided that uses a hollow, porous-wall, closed-end tube communicating with the gas to be metered and slidable past a vacuum seal so as to expose more or less of the porous tube wall to the vacuum region and hence to controllably leak the gas through the porous wall into the vacuum system.

2 Claims, 3 Drawing Figures

GAS LEAK VALVE

BACKGROUND OF THE INVENTION

This invention was made in the course of, or under, a contract with the U. S. Atomic Energy Commission.

Many principles have been incorporated into the construction of various valves designed to control the rate of leakage of gaseous products into a vacuum system. The number of valve designs available attests, to some degree, to the difficulty experienced in achieving a "universal" valve. Most prior art valves are rendered inoperative by corrosive gases, and nearly all are relatively complicated and expensive. In general, such leak valves operate on the principle of withdrawal of a needle from an orifice, of separating two mating surfaces, of vibrating one of two mating surfaces, or of restricting the cross section of a long elastic passage. Typically, the response of prior art gas leak valves is non-linear at low flow rates. Thus, there exists a need for an improved gas leak valve that has a substantially linear response for all flow rates at a given pressure. The present invention was conceived to meet this need in a manner to be described hereinbelow.

SUMMARY OF THE INVENTION

It is the object of the present invention to provide an improved gas leak valve that has a substantially linear response for all flow rates at any given input pressure for the input gas. This object has been accomplished in the present invention by providing a sliding, hollow, cylindrical member of porous material as a control device within a corrosion resistant guide cylinder. This porous member is provided with a solid end and is adapted to pass through a double O-ring system which serves as a leak-tight trap for the movement of the porous member into a vacuum region and as a barrier to separate the low pressure (vacuum) side of the system from the pressure within the enclosing corrosion resistant guide cylinder on the other side of the system in a manner to be described hereinbelow.

DESCRIPTION OF THE PREFERRED EMBODIMENT

Figure 1:
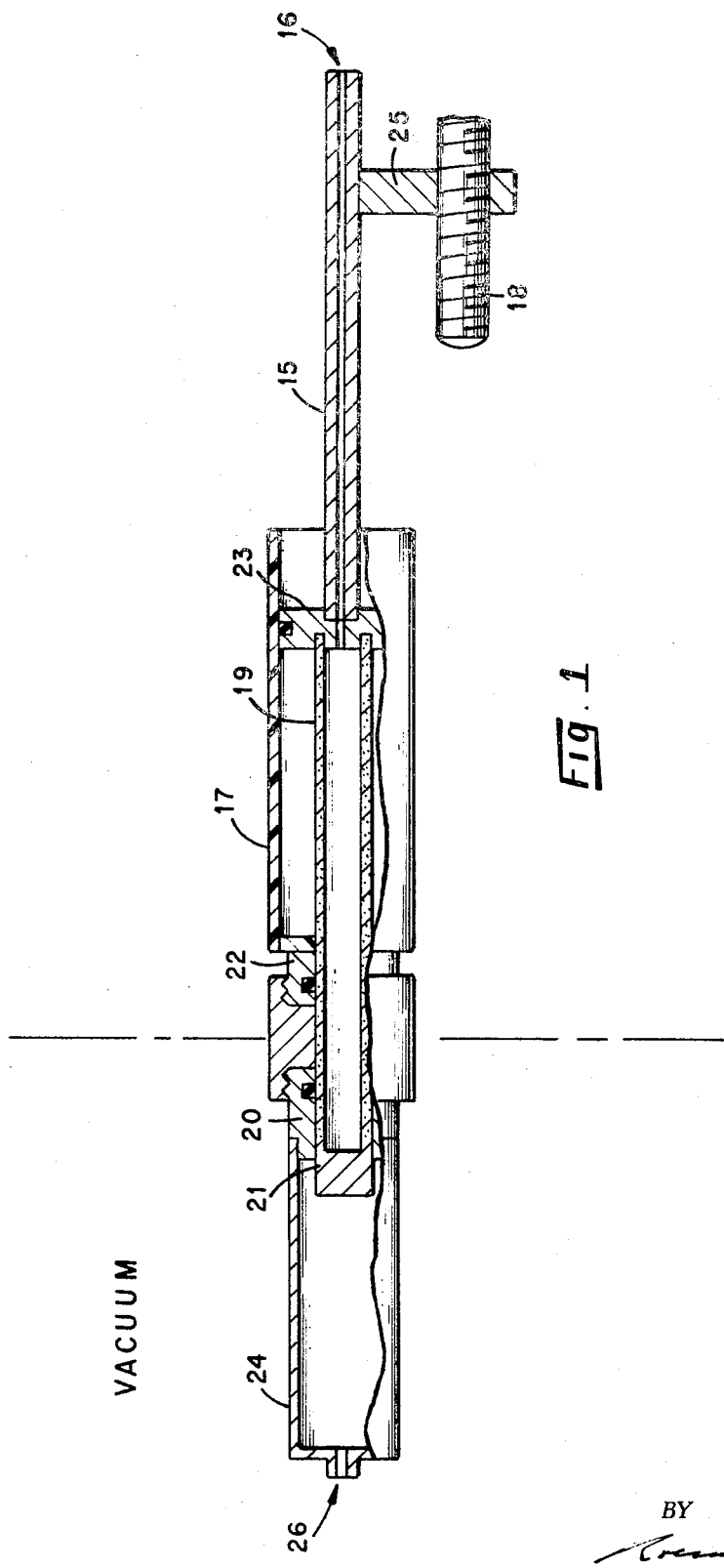
FIG. 1 is a cross-sectional drawing of the valve of the present invention.

As illustrated in FIG. 1, the gas leak valve of the present invention utilizes a sliding hollow, cylindrical member 19 of porous material as a control device within a corrosion resistant (nylon, Teflon, etc.) guide cylinder 17. The chamber of guide cylinder 17 is sealed to prevent gas leakage into the surrounding atmosphere by a guide ring 23 and its associated O-ring. A metallic gas feed tube 15 is mounted in the guide ring 23, as well as the porous member 19 on opposite sides thereof, as shown, and the gas feed tube 15 communicates with the interior of the porous member 19 by means of feed-through hole in the guide ring 23.

A high pressure gas to be leaked into the vacuum region enters the tube 15 at a point 16 from a source of gas supply, not shown. Gas feed tube 15, which also serves as a push rod, is affixed to a member 25 and the tube 15 is driven into the guide cylinder 17 by means of a small reversible motor, not shown, by means of a worm drive 18 feeding through the affixed member 25. The porous, hollow member 19 may be constructed from graphite, for example, and it is provided with a solid end 21. The inside pressure of the porous member 19 is the same as and communicates with that in the push rod 15. The porous graphite tube 19 is allowed to pass into and through a double O-ring system 20 and 22, which serves as a leak-tight trap for the movement of tube 19 and as a barrier to separate the low pressure (vacuum) side of the system from the pressure in the guide cylinder 17.

The amount of gas from the high pressure region inside graphite tube 19 that is allowed to leak into the low pressure cylinder 24 is a function of the surface area of the porous graphite tube 19 which is exposed to the low pressure side (if other parameters are fixed). The gas leaked into the cylinder 24 is fed into the vacuum system by means of an opening 26 mounted in the end of cylinder 24 and communicating therewith. To increase the flow rate, the metal push rod 15 is inserted further into the low pressure cylinder 24 by the reversible motor; to decrease the flow rate, the rod 15 is withdrawn a desired amount from this region. To stop the flow completely, the rod 15 is withdrawn until the solid end 21 of the graphite tube 19 passes into the O-ring 20.

Figure 2:
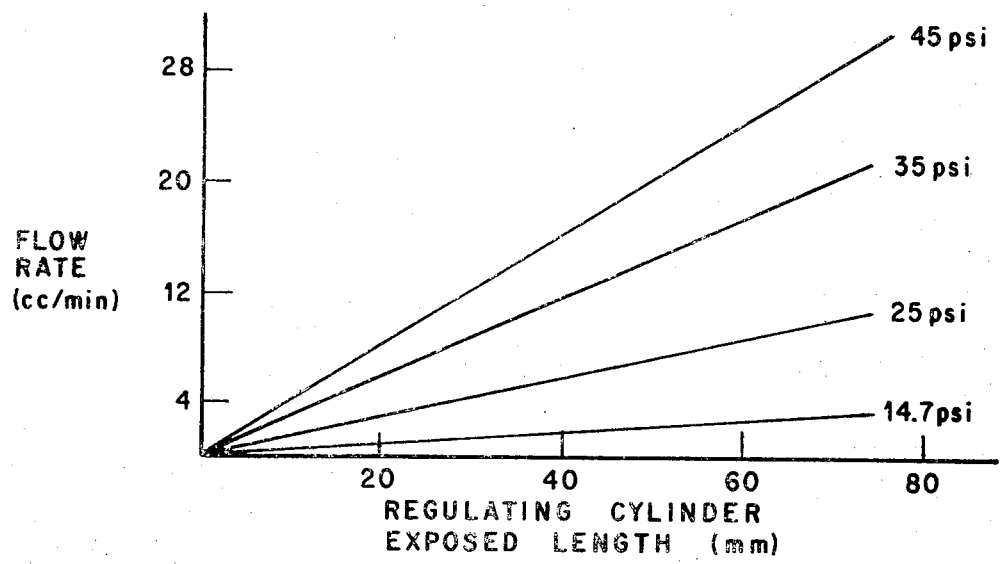
FIG. 2 is a graph showing typical results obtained with the valve of FIG. 1.

Four leak-rate curves, as shown in FIG. 2, were obtained by making incremental changes in the length of the porous tube 19 exposed to low pressure in the operation of the device of FIG. 1. It should be noted that the data for plotting the four response curves in FIG. 2 were such that the curves were substantially linear, and have been shown as such for the sake of clarity. The graphite tube 19 was moved a total distance of 73 mm, thus changing the exposed area from 0 to 945 mm². The outside parameters in the four determined curves were, respectively, (a) 14.7 psi air, (b) 25 psi argon, (c) 35 psi argon, and (d) 45 psi argon. Adjustments in exposed tube 19 length were made by the small reversible motor with a speed of 6 rpm. With this system, 30 seconds were required for each 3.5 mm of travel. The slope of rate-with-area response is seen to vary, as expected, with the applied pressure.

Figure 3:
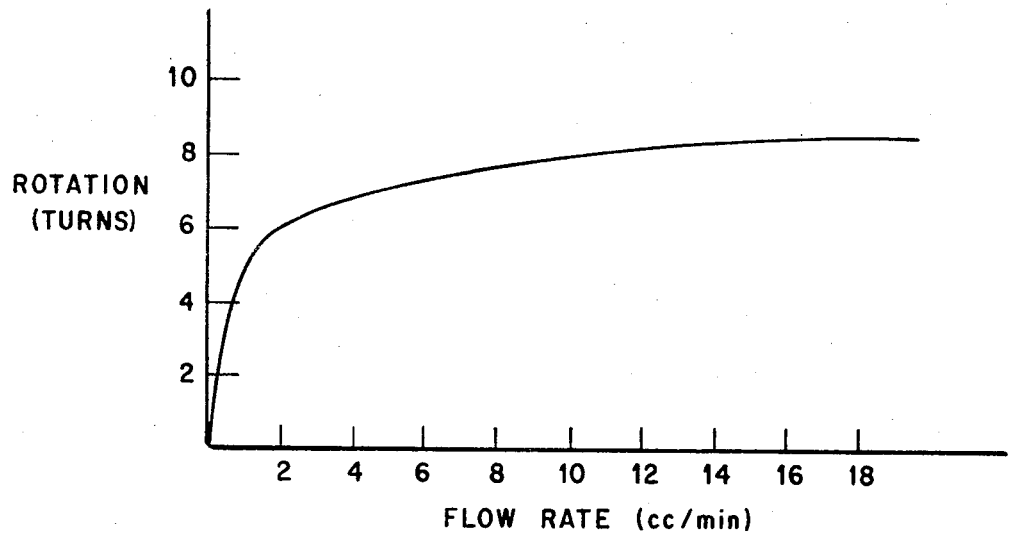
FIG. 3 is a graph showing the response of a typical commercial leak valve.

In FIG. 3, the response of a commercially available leak valve is shown. The non-linearity at low flow rates is typical for such valves.

The gas leak valve described above will be used in the Electromagnetic Isotopes Separations Program at one of the U. S. Government laboratories. It provides the following advantages:

1. Linear response of flow rate over an extremely wide range with variation in position of the sliding member.
2. High degree of long-term leak rate stability.
3. No need for vacuum lubricants of any type.
4. Withstands corrosive gases ($Cl_2$, $Br_2$, $S_2Cl_2$, etc.).
5. Provides positive filtration of gases entering the vacuum via the porous member (unique feature not shown to exist with other type valves).
6. Minimizes construction costs and problems of repair due to wear or corrosion.

In addition to isotope separation, the leak valve of the present invention could also have application in vacuum instrumentation, high energy accelerators, and allied technology.

The present gas leak valve was designed for simplicity and represents only one of many possible arrangements which could be conceived in the application of the disclosed leak control concept. It is a very simple one when compared with commercially available designs, yet in its simplicity it has demonstrated a remarkable long-term stability, an almost linear response of leak rate as a function of exposed low pressure area, and a reasonable increase or decrease in flow rate range as a function of applied pressure. Refinements in design can produce almost any leak response desired while providing additionally for the entrance of filtered gas into the system without its contacting any lubricants.

The following modifications are within the scope of the present invention:

1. Increased sensitivity in linear response of flow rate with position (thinner walls or increased pressure on the high-pressure side of the porous member);

2. Decreased sensitivity in linear response with position, when such is desired (thicker walls or decreased pressure on the high-pressure side of the porous member); and 3. Non-linear leak response with position, when such is desired (conical-shaped or otherwise contoured interior walls of sliding porous member).

This invention has been described by way of illustration rather than limitation and it should be apparent that it is equally applicable in fields other than those described.

What is claimed is:

1. An improved gas leak valve comprising a hollow, porous-wall tube provided with a solid closed end and an open end; a gas-feed tube; a guide ring, said gas-feed tube affixed to said open end of said porous-wall tube and communicating therewith by means of said guide ring, said gas-feed tube acting as a push-rod for said porous-wall tube; a guide cylinder provided with an open end with the other end thereof defining a passageway for movement of said porous-wall tube therethrough, said guide cylinder enclosing a portion of said porous-wall tube and a portion of said gas-feed tube; a sealing O-ring positioned between said guide ring and the inner surface of said guide cylinder; a low-pressure cylinder adapted to be positioned within a vacuum chamber and provided with a gas-leak aperture on one end thereof; and a double O-ring sealing system encompassing said porous tube and being affixed to the other end of said low-pressure cylinder and to said other end of said guide cylinder, said porous tube being adapted to be positioned by said push-rod gas-feed tube from a no flow position to desired and selected further positions within said low-pressure cylinder to thereby selectively control the flow rate of feed gas from said gas-feed tube and then through said porous-wall tube into said low-pressure cylinder for exit through said gas-leak aperture as a function of the degree of insertion of said porous-wall tube into said low-pressure cylinder past said double O-ring sealing system.

2. The gas leak valve set forth in claim 1, wherein said porous-wall tube is fabricated from graphite.

* * * * *